Nov. 27, 1934.  S. B. CLARK  1,982,044
PIPE JOINT
Filed July 22, 1933  2 Sheets-Sheet 1
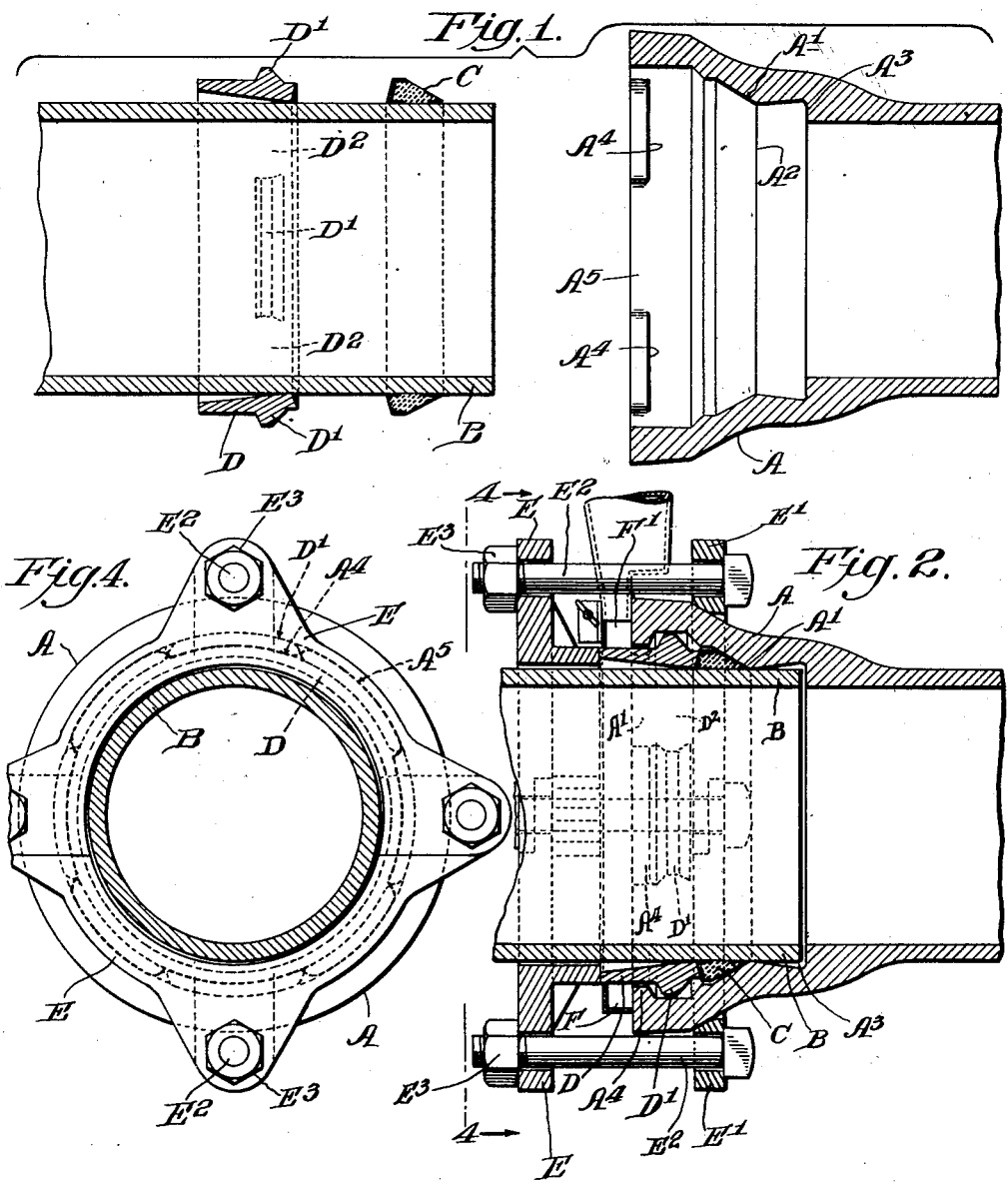
Witness:
Inventor
Stuart B. Clark
by
Attorney.

Nov. 27, 1934. S. B. CLARK 1,982,044
PIPE JOINT
Filed July 22, 1933 2 Sheets-Sheet 2
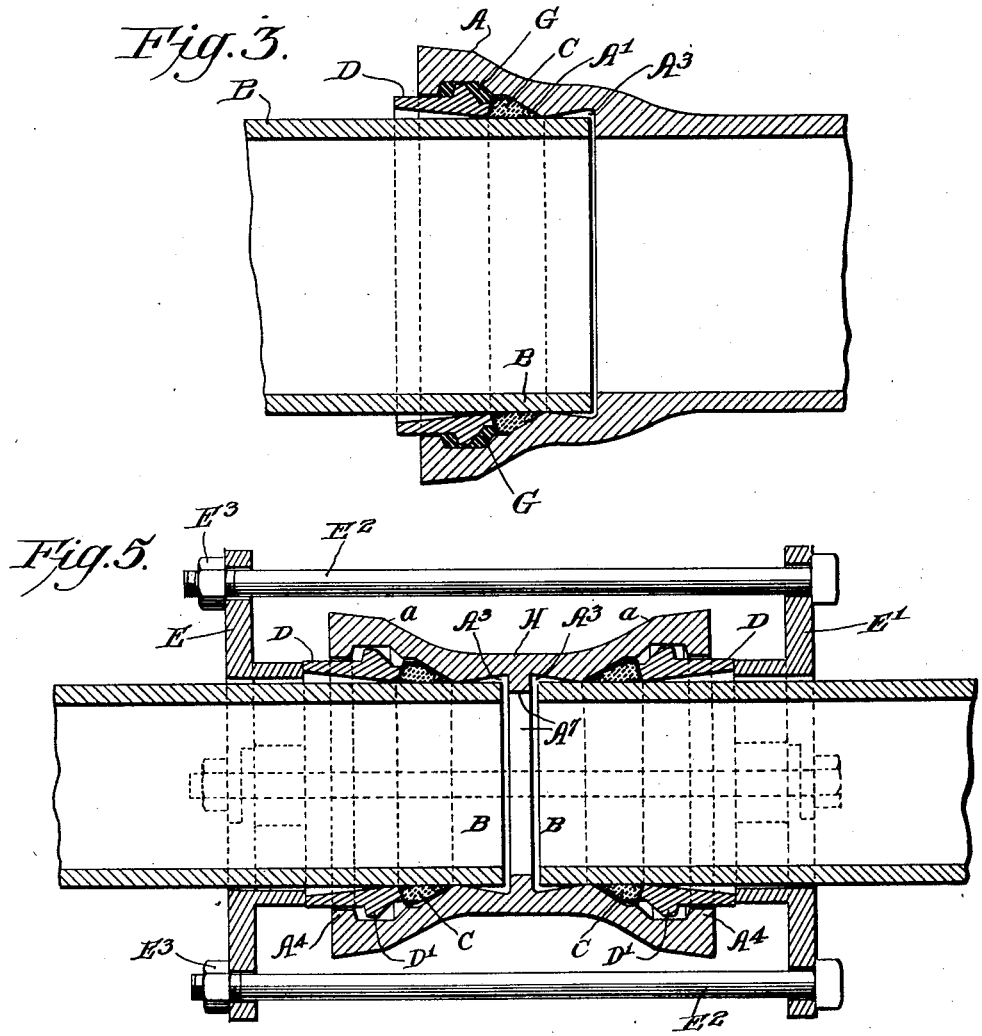
Inventor
Stuart B. Clark
Attorney.

Patented Nov. 27, 1934

1,982,044

UNITED STATES PATENT OFFICE 1,982,044

PIPE JOINT

Stuart B. Clark, Riverton, N. J., assignor to United States Pipe and Foundry Company, Burlington, N. J., a corporation of New Jersey Application July 22, 1933, Serial No. 681,707

2 Claims. (Cl. 285—115)

My invention relates to the construction of pipe joints of the kind which are formed between the cylindrical end of one pipe and the bell end of another pipe or coupling and, particularly, to that familiar type of pipe joints in which a compressible gasket is located on a seat, preferably tapered, formed in the inner portion of the bell and pressed against its seat and against the walls of the coupled pipes by means of a gland located in the annular space between the inner pipe and the bell and resting upon the gasket. As heretofore generally constructed and used, the gland is drawn to and held in gasket compressing position by means of bolts and nuts, forming a permanent element of the joint and adding materially to the cost of the joint and, while it is true that a number of constructions have been suggested and described for anchoring the gland in gasket compressing position and thereby making possible the removal of the bolts and nuts employed to move the gland and compress the gasket, such devices have not, to the best of my knowledge and belief, gone into general use.

The object of my invention is to provide a simple, inexpensive and efficient construction by which the gland, after it has been moved to gasket compressing position, can be securely held in this position so that the means employed for shifting the gland to gasket compressing position can be disconnected without impairing the efficiency of the joint and, generally speaking, my invention consists of a pipe joint made up of a bell having an annular gasket seat on an inner portion and a series of spaced inwardly projecting lugs formed on its inner portion between its gasket seat and the outer end of the bell, the spigot end of a pipe entered in the bell and extending through the gasket seat, an annular gasket seated on the gasket seat and compressed so as to form a tight contact with its seat and with the opposite walls of the spigot and bell, an annular gland located in the space between the spigot and bell and pressing against the gasket to hold it in joint forming position and expansion, said gland being formed on its outer surface with a spaced series of outwardly extending transverse lugs of such size and arrangement that they can pass between the lugs formed on the bell and so located on the gland that when the gland is in position to properly compress the gasket they will lie inside of, out of contact with and at a distance from the lugs formed on the bell, and a cast annulus of incompressible material formed in the space between the gland and the bell and so interengaged with the lugs of the gland and bell as to hold the gland in gasket compressing position and, my improved construction makes it practical to build up the joint by the following method, that is to say, to assemble the bell, spigot, gasket and gland in approximately the relative positions which they occupy in the finished pipe joint, then to apply pressure to the outer end of the gland to move it inward against the gasket for a sufficient distance to thoroughly expand the gasket into contact with its seat and with the walls of the spigot and bell, then to charge the annular space between the gland and bell with a liquefied substance having the capacity of setting into a solid under the conditions existing in the joint so that said material will form a cast annulus interengaged with the lugs on the bell and gland, then, while the gland is still under pressure, permitting the cast annulus to set and solidify and then, after the gland is anchored in position by means of the cast annulus, releasing the pressure applied to bring the gland into joint forming position. Other features of my invention will be best understood as described in connection with the drawings which illustrate my improved pipe joint and the steps to be taken in its construction.

In the drawings,

Figure 1 is a view showing the separate parts used in the construction of my joint, with the exception of the cast annulus, said parts being shown in longitudinal section and arranged in the order in which they are assembled before their interengagement to form a joint.

Figure 2 is a longitudinal sectional view showing the parts making up my joint assembled in the positions they occupy before the gasket is compressed, with the exception of the cast annulus and with the addition of means for pressing the gland inward and of means for pouring the liquid which is to form the cast annulus, into the space which is to be occupied by the cast annulus.

Figure 3 is a longitudinal section of my completed joint.

Figure 4 is a cross-sectional view taken as on the line 4—4 of Fig. 2, with the lugs which form the ledges in the bell and on the gland indicated in dotted lines. In this view the dam and pouring spout are omitted, and Figure 5 is a longitudinal section of a modified construction in which the spigot ends of two pipes are entered in the bell ends of a coupling, the parts being shown as assembled prior to the compression of the gasket.

A, Figs. 1, 2, and 3, indicates the bell end of a pipe formed with an annular gasket seat, as indicated at $A^1$, through which extends a short opening $A^2$, slightly larger than the diameter of the spigot end of a pipe to be introduced into the bell and opening into a somewhat enlarged chamber indicated at $A^3$. To adapt the bell, which is otherwise of usual construction, for use as an element of my improved joint, it is necessary that it should have formed on its inner surface between the gasket seat and the outer end of the bell, a series of spaced transverse lugs to engage with the cast annulus which forms a portion of my improved joint and, the inwardly projecting lugs formed on the walls of the bell are indicated at $A^4$, $A^4$ located, preferably, at or adjacent to the outer end of the bell and spaced from each other as indicated at $A^5$. B is a cylindrical spigot end of a pipe entered in the bell as indicated. C is an annular gasket of compressible material seated on the gasket seat $A^1$ and by means to be described the gasket is compressed and expanded, as shown in Fig. 3, to form the joint. D is a cylindrical gland entered in but not filling the space between the spigot and bell and having its inner end abutted against the gasket. This gland is, by preference, of such length that its outer end will extend beyond the bell and it is formed with spaced outwardly extending transverse lugs on that portion of its outer surface which lies in the annular space it occupies, such lugs being formed as indicated at $D^1$, $D^1$, etc., by outwardly extending ribs. The length of the ribs is such that they can pass through the spaces $A^5$ between the ribs $A^4$ on the bell and the spaces $D^2$ between the ribs $D^1$, are, of course, of such length as to give passage to the ribs $A^4$ on the bell. E and $E^1$ indicate split rings, the ring $E^1$ surrounding and abutting the outer end of the bell and the ring E surrounding the spigot and abutting against the end of the gland D. $E^2$, $E^2$, etc., indicate bolts passing through lugs of the split rings and $E^3$, $E^3$, etc., nuts on the ends of the bolts. F is a ring like dam located at the end of the bell formed of asbestos or the like and provided with a pouring gate indicated at $F^1$. G, Fig. 3, is a cast annulus located in the annular space between the bell and gland and interengaging with the lugs formed on the bell and gland as described. H, Fig. 5, is a coupling member comprising a bell $a$ at each end. The constructive features of the two bells are essentially the same as those shown in the constructions illustrated in Figs. 1 to 3, and are marked with the same letters. An intermediate annular rib indicated at $A^7$ separates the two chambers $A^3$ and serves as an abutment for the spigot ends B, B. In this construction the harness or device for applying pressure to the glands D, D, comprise two split rings, E, $E^1$, surrounding the two spigot end pipes and abutting against the glands D, D, with bolts $E^2$ and nuts $E^3$ by which pressure is simultaneously applied to both glands.

In operation, the parts are assembled, as shown in Fig. 2; pressure is then applied to the gland D so as to force it against the gasket and compress the gasket into a joint forming position by screwing up the nuts $E^3$ on the bolts $E^2$. When the gland has reached its final joint forming position, as shown in Fig. 3, a liquid of such a character that it will set into a solid under conditions existing in the joint, is poured into the space between the bell and the gland so as to form an annulus, interengaging the lugs formed as by the ribs $A^4$ and $D^1$ and permitted to solidify into a solid cast annulus operating to firmly lock the gland in the position in the joint which it occupies at the time of the pouring and solidification of the annulus and after the annulus is set and solidified the pressure previously holding the gland in gasket compressing position is released as by unscrewing the nuts $E^3$ and removing the bolts $E^2$ and removing the split rings E and $E^1$. The dam F and pouring gate $F^1$ are, of course, removed after the solidification of the cast annulus.

The method steps in the preparation of the joints in the modification shown in Fig. 5 are essentially the same as above described.

I have referred to the formation of the cast annulus which serves to anchor the gland in joint forming position, as formed by pouring a liquid having the characteristic of solidifying under conditions existing in the joint and, in using the term "liquid", I desire to be understood as referring to any substance which is initially, or can initially, be brought to such a degree of liquidity that it can be poured or forced into the annular chamber formed between the bell and gland so as to form, when set, a rigid abutment for the lugs on the bell and the gland, said liquid having, of course, the capacity, as stated, of setting into a solid under conditions existing in the joint. For example, lead or lead alloys brought to liquidity by heat are excellent materials for the formation of the cast annulus and sulphur compounds such as are commonly used in the formation of pipe joints, are also well fitted for the formation of my joints and, again, cement compounds may be charged into the annular space while in the liquid condition generally known as plastic and permitted to set to form the locking annulus. The essential feature of my joint is the provision of a solid and rigid annulus cast in situ so as to engage the lugs on the bell and gland and serving to lock the gland in joint forming position.

In the construction of my joint, as shown in Figs. 1, 2, and 3, in which spaced lugs are formed in the bell and on the gland by means of projected ribs, I prefer, after entering the gland in the bell, to turn it to a sufficient angle to bring the lugs $D^1$ on the gland opposite to the lugs $A^4$ on the bell, as shown in Figs. 2, 3, and 4.

Having now described my invention, what I claim as new and desire to secure by Letters Patent, is:

1. A pipe joint comprising a bell adapted to receive a spigot end of a pipe and provided with an annular gasket seat located to surround a portion of the spigot when entered in the bell and with a series of transversely extending inwardly projecting spaced lugs formed on its inner surface beyond the portion of the bell in which the gasket is located in combination with the spigot end of a pipe entered in the bell, an annular gasket surrounding the spigot end and seated on the gasket seat formed in the bell, an annular gland located in the annular space between the outer portion of the bell and the spigot end of the coupled pipe and so located therein as to hold the gasket in compression, said gland being formed with a series of transversely extending and outwardly projecting spaced ribs on its outer surface, said ribs being so located on the gland that, when the gasket is under compression they will lie inside of and at a distance from the ribs formed on the bell and so proportioned and spaced as to pass through the spaces intervening between the lugs formed on the bell and means for locking the gland in gasket compressing position in the bell consisting of an annulus of a material capable of being cast and normally incompressible at ordinary temperatures located in the annular space between the gland and the bell and interengaged with the ribs formed thereon.

2. A pipe joint as called for in claim 1, further characterized in that the ribs formed on the gland are in the completed joint so disposed as to lie inside of, opposite to and out of contact with the ribs formed on the bell.

STUART B. CLARK.